United States Patent [19]

Brotto

[11] Patent Number: 5,557,190
[45] Date of Patent: Sep. 17, 1996

[54] BATTERY RECHARGING SYSTEM WITH SIGNAL-TO-NOISE RESPONSIVE FALLING VOLTAGE SLOPE CHARGE TERMINATION

[75] Inventor: Daniele C. Brotto, Baltimore, Md.

[73] Assignee: Black & Decker Inc., Newark, Del.

[21] Appl. No.: 203,117

[22] Filed: Feb. 28, 1994

[51] Int. Cl.$^6$ ................................................ H01M 10/44
[52] U.S. Cl. .................................................. 320/21; 320/31
[58] Field of Search ................................ 320/20, 22, 23, 320/24, 31, 39, 40, 21

[56] References Cited

U.S. PATENT DOCUMENTS

| | | | |
|---|---|---|---|
| 4,388,582 | 6/1983 | Saar et al. | 320/20 |
| 4,392,101 | 7/1983 | Saar et al. | 320/20 |
| 5,206,579 | 4/1993 | Kawate et al. | 320/20 |
| 5,352,969 | 10/1994 | Gilmore et al. | 320/39 |
| 5,376,873 | 12/1994 | Toya | 320/20 |
| 5,432,426 | 7/1995 | Yoshida | 320/20 |
| 5,449,996 | 9/1995 | Matsumoto et al. | 320/20 |

*Primary Examiner*—Peter S. Wong
*Assistant Examiner*—Edward Tso
*Attorney, Agent, or Firm*—Harness, Dickey & Pierce, P.L.C.

[57] ABSTRACT

The falling voltage slope charge termination routine is performed during intervals of the charging cycle in which signal-to-noise ratio is comparatively high. The falling voltage slope charge termination technique is automatically disabled or rendered less sensitive to noise during times when the signal-to-noise ratio is comparatively low. In this way, accurate charge termination is accomplished without error otherwise induced by voltage noise during charging. The charge termination technique responds quickly to a charged battery indication, since signal averaging to negate the effects of noise can be minimized or eliminated.

23 Claims, 4 Drawing Sheets

BATTERY RECHARGING SYSTEM WITH SIGNAL-TO-NOISE RESPONSIVE FALLING VOLTAGE SLOPE CHARGE TERMINATION

BACKGROUND AND SUMMARY OF THE INVENTION

The present invention relates generally to rechargeable batteries and to electronic circuits for charging rechargeable batteries.

Rechargeable batteries have become quite popular for use in electronic equipment, power tools, portable computers, cordless phones, children's toys, and the like. Virtually every user of rechargeable batteries wants the ability to recharge as quickly as possible. In addition, some users like the convenience of being able to leave a rechargeable battery in the charger at all times, so that a fully charged battery will always be available. To accommodate the former requirements, there are a number of quick-charging battery chargers available. To accommodate the latter, there are a number of trickle charging battery chargers available.

Whether the battery charger is designed as a quick-charger or as a trickle charger, it is highly desirable to avoid overcharging. Overcharging produces undesired heating and high pressures which can physically and chemically alter the cells of the battery and degrade the battery's capacity to hold charge. This problem is particularly prevalent when quick-charging battery chargers are used. Quick-charging battery chargers typically deliver a high charging current which can rapidly overheat the battery unless the charging current is terminated or greatly reduced once the fully charged condition is reached.

Determining precisely when to terminate the high charging current is not simply a matter of sensing when the battery voltage reaches a fully charged level. In most batteries the voltage rises in a nonlinear way as charging current is applied, and it is often difficult to accurately sense or predict when the fully charged voltage is reached.

The Applicant's assignee has devoted a considerable effort in analyzing the voltage characteristics of rechargeable batteries as charging current is applied. It is now known that the battery voltage increases over time as charging current is applied and that the voltage-time curve exhibits various inflection points where the slope of the first derivative curve of the voltage variation with time actually changes from positive to negative or from negative to positive. The Saar et al. U.S. Pat. Nos. 4,388,582 and 4,392,101, assigned to the assignee of the present invention, describe these inflection points in conjunction with a rapid charging system for rechargeable batteries.

Although the inflection point analysis technique described in the Saar et al. patents has been widely successful, there is still interest in further improvement. Today the Saar et al. technique is frequently implemented using microprocessor or microcontroller circuitry which periodically samples the battery voltage during charging and uses that sample data to perform an inflection point analysis. Analog-to-digital converters are used in sampling the battery voltage data and converting that data into digital values which the microprocessor manipulates. The Assignee's current technology uses logarithmic analog to digital converters for this purpose.

Inasmuch as the sampled voltage data is already being obtained for use by the Saar inflection point analysis technique, that data can also be used to perform other charge termination techniques. One such technique is the negative slope technique which seeks to terminate charging current when the slope of the voltage-time curve becomes negative. The falling slope technique can be used in place of the Saar inflection point technique or it can be used to augment the Saar technique. One problem with the falling voltage or negative slope technique is that it can be quite sensitive to noise. Noise is particularly troublesome in the flat regions of the voltage-time curve, since a momentary drop in voltage due to noise can be misinterpreted as a falling voltage or negative slope.

The present invention solves the noise problem by automatically changing the effective sampling rate during the flat region of the voltage-time curve to obtain higher noise immunity. Modulation of the sampling rate to improve the noise immunity may be effected by sensing the slope of the voltage-time curve and automatically decreasing the sampling rate when the shallow portion of the curve is reached. In accordance with one aspect of the invention, the sampling rate can be effectively decreased by switching off the falling voltage slope termination technique during a predetermined charging interval corresponding to the flat region of the curve. Turning off the charge termination routine in this fashion has the effect of increasing the sampling interval to a time longer than the flat portion of the curve. Thus any noise-induced falling voltage fluctuations during this interval are ignored.

In accordance with another aspect of the invention, the sampling rate during the flat portion of the curve can be decreased by suitable manipulation of the voltage readings stored on the microprocessor memory stack. Using this technique, samples of the battery voltage are continually taken at predetermined intervals and stored on the stack. A slower sampling rate is effected during the flat portion of the curve by using every other stored value, every third stored value, every fourth stored value, and so forth, to achieve the desired sampling rate modulation. If desired, adjacent stack values can be averaged thereby further mitigating the effects of noise.

Accordingly, in its simplest form, the present invention solves the aforementioned problem associated with the falling voltage slope termination technique by automatically disabling that technique when the signal to noise ratio is poor (i.e. when the voltage-time curve is comparatively flat). At other times, the falling voltage slope technique is enabled, allowing the battery charging to be terminated when the battery achieves full charge and the voltage begins to drop. In this way, the falling voltage slope technique can be used in conjunction with the Saar inflection point technique or as a replacement for it.

For a more complete understanding of the invention, its objects and advantages, reference may be had to the following specification and to the accompanying drawings.

DETAILED DESCRIPTION OF THE PREFERRED EMBODIMENTS

The following description of the preferred embodiments concerning fast battery charging is merely exemplary in nature and is in no way intended to limit the invention or its application or uses.

Figure 1:
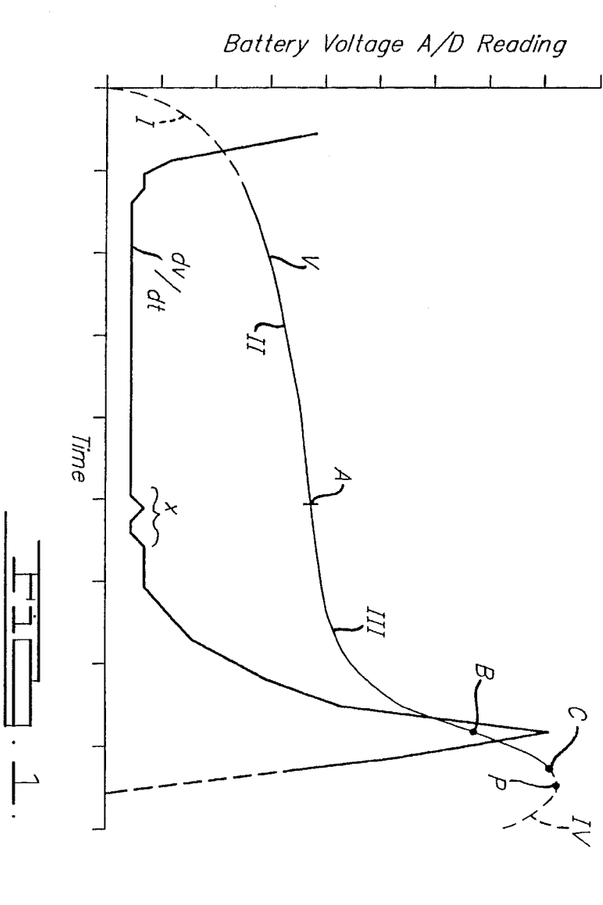
FIG. 1 is an exemplary voltage-time charging curve for a nickel cadmium battery showing exemplary inflection points at A and B.

As disclosed in the Saar et al. patents, a typical voltage-time curve of a charging sequence of a nickel cadmium (NiCad) battery is shown in FIG. 1. It is noted that the discussion herein is directed to charging a single battery; however, it is equally applicable to a series of batteries as would be found in a battery pack. As the battery is being charged, the voltage continuously rises as indicated by the curve until it reaches a desirable maximum charge point. Although the specific values of the curve may differ from battery to battery, the general shape of the curve is typical for all nickel cadmium batteries. Likewise, each other type of rechargeable battery known in the art will have a typical voltage-time curve indicative of its type and, as such, the process discussed below is applicable to any of these other types.

As shown, the voltage-time curve can be separated into at least four distinct regions. Region I represents the beginning of the charging sequence just after the battery is initially attached to the charger and the charging begins. This region is represented by a dotted line due to the fact that the voltage characteristics in this region are somewhat unreliable and may vary from battery to battery in accordance with its prior history of being charged and discharged and its present state of discharge. Additionally, this region is of little importance in the charging sequence since it is generally traversed within a relatively short period of time (usually between 30 to 120 seconds) after the start of the charging sequence.

After the charging sequence passes through region I, the charging curve will enter the more stable region II. Region II is generally the longest region of the charging sequence, and is marked by most of the internal chemical conversion within the battery itself. Because of this, the voltage of the battery does not substantially increase over region II, and thus, this region represents a plateau region in the charging curve. At the end of region II is an inflection point A in the curve. Inflection point A represents a transition from region II to region III, and is noted by a point where the slope of the curve changes from a decreasing rate to an increasing rate.

Region III is the region in which the battery voltage begins to increase rapidly with respect to time, thus representing a region of rapid voltage rise. As the battery voltage increases through region III to its fully charged condition, the internal pressure and temperature of the battery also increases. When the effects of temperature and pressure within the battery begin to take over, the increase in battery voltage begins to taper off. This tapering off effect is noted as inflection point B and is also characterized by the sharp fall in the voltage derivative curve dV/dt.

Region IV represents the fully charged region between the inflection point B and including charge termination target represented by point C. The charging voltage only stabilizes at point C for a very short period of time. Consequently, if charging continues, the additional heating within the battery will cause the voltage of the battery to decrease and in addition may cause damage to the battery.

The Saar et al. patents disclose a method of analyzing the battery voltage versus time-charging curve by detecting the inflection points in the curve in order to determine the appropriate time to terminate the fast charge process. By measuring the slope of the charge curve at a predetermined sampling rate, it is possible to first determine inflection point A and then begin looking for inflection point B. Since the sampling period is constant, the calculation of the slope is merely a subtraction of the most recent voltage sample from a previous voltage sample. However, once the occurrence of inflection point B is detected, the battery voltage is actually beyond inflection point B. Thus, by terminating charging upon the detection of the second inflection point B, the battery voltage is actually at a point approximated by point C on the curve when charging is discontinued. Accordingly, it will be appreciated that this charge control procedure avoids overcharging of the battery into region IV of the curve.

Figure 2:
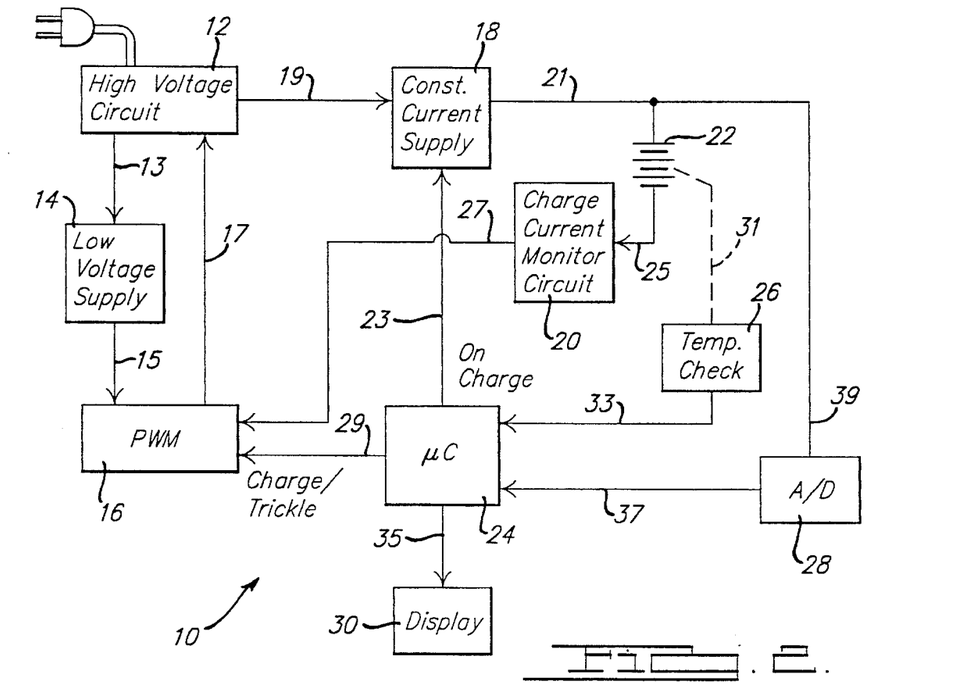
FIG. 2 is a schematic block diagram showing the major operational and control circuitry of a fast battery charging system.

The basic circuit components operable to be used in an inflection analysis fast battery charger will first be discussed. It is noted that these components are illustrated by way of a nonlimiting example as other circuit configurations will be equally applicable. Turning to FIG. 2, a half bridge-type power supply circuit 10 is shown in a block circuit diagram. Circuit 10 includes a high voltage input circuit 12 for supplying high voltage to some components of the circuit 10, a low voltage power supply circuit 14 for supplying a low voltage supply to other components of the circuit 10, a pulse width modulation oscillator circuit 16 for generating a high frequency output to be used as a control input for the high voltage circuit 12, a constant current supply circuit 18 for providing a constant current supply to a battery 22 to be charged, and a charge current monitoring circuit 20 for monitoring the charge current rate of the battery 22 and for providing a feedback signal to the pulse width modulation circuit 16 to desirably vary the control signal provided to the high voltage circuit 12. A microcomputer 24 is incorporated for controlling the charging scheme. Other circuit components of the circuit 10 include an optional temperature check circuit 26 which monitors the temperature of the battery 22, and a digital display circuit 30 for providing an indication to the operator of the various parameters of the charging process. Additionally, an analog-to-digital converter 28 is provided for converting the analog battery voltage signal from the battery 22 to a digital signal suitable for processing by the microcomputer 24.

The high voltage circuit 12 receives a 120 volt alternating current (AC) generally from a standard outlet. The alternating input signal is rectified and filtered to produce a smooth DC voltage of approximately 150 volts. The AC input signal is also applied, through a transformer (not shown), to the low voltage supply circuit 14 along line 13. The low voltage supply circuit 14 rectifies the AC signal and applies it to certain voltage regulator circuits (not shown) to provide regulated 5-volt and 15-volt outputs for the other circuit components. The various 5-volt and 15-volt supply lines to the other circuit components of the circuit have been omitted for clarity.

The pulse width modulator (PWM) oscillator circuit 16 receives a 15-volt signal from the supply circuit 14 along line 15 and provides a pulsed frequency signal, generally in the form of a square wave, along line 17 to the high voltage circuit 12. The square wave signal from the oscillator circuit 16 is provided through a coupling transformer (not shown) to a pair of power switching transistors (not shown) which, via conventional phase control techniques, regulate the amount of current supplied to the primary coil of the main step down transformer for each half cycle of the AC waveform. The step down transformer converts the high voltage signal on its primary coil to a low voltage, high current signal at its secondary coil and applies this signal to the constant current supply circuit 18 along line 19. The duty cycle of the pulse width modulator signal from the oscillator circuit 16 thus controls the level of charging current applied to the battery 22. The pulse width modulation approach minimizes the size of the step down transformer required to provide the necessary high current to the current supply circuit 18. PWM oscillator circuit 16 also includes a soft start circuit (not shown) for gradually ramping up the duty cycle of the PWM oscillator circuit 16 when the charging sequence is initiated.

When the microcomputer 24 initiates a charging sequence by applying a signal on line 23 to the current supply circuit 18, charge current is applied to the battery 22 through the low voltage constant current supply circuit 18 along line 21. The current supply circuit 18 preferably includes a reverse polarity detection circuit (not shown) which protects the circuit 10 from damage in the event that the battery 22 is inserted backwards. The battery current is sensed along line 25 by charge current monitoring circuit 20. If the charge current varies from the predetermined level, the charge current monitoring circuit 20 will provide an output on line 27 to the PWM oscillator circuit 16. The PWM oscillator circuit 16 will then alter the duty cycle of the square wave signal to the high voltage circuit 12 in order to alter the current charge current appropriately. Likewise, at the end of the high current charging sequence, the microcomputer 24 produces an output signal on a charge/trickle line 29 to switch to a trickle charge mode.

The temperature check circuit 26 provides a circuit for monitoring battery temperature. The dotted line 31 from the temperature check circuit 26 represents a heat sensing device, such as a thermistor, that is physically located adjacent the position of the battery 22 when it is plugged into the charger to sense the temperature of the battery 22. The temperature check circuit 26 determines when the battery temperature exceeds a predetermined threshold value and in such event sends a signal along line 33 to the microcomputer 24. The microcomputer 24 then sends a signal on line 23 to halt the charging process.

In order to enable the microcomputer 24 to monitor the charging sequence to determine the inflection points in the charging curve of FIG. 1, it is necessary to convert the analog battery voltage signal to a digital signal. Therefore, an analog-to-digital converter 28 is incorporated. The analog-to-digital converter 28 receives the analog battery voltage on line 39 and produces a digital signal on line 37 which the microcomputer 24 uses to determine the battery voltage value. If desired, the digital signal may be in the form of a timing signal in which clock pulses are produced and counted to yield digital "count" values representing voltage.

Inflection points in the charging curve are determined by monitoring the slope of the curve (the first derivative or time rate of change of the curve) to detect when the slope reaches a minimum value or a maximum value; i.e., when the rate of change in the slope changes from a negative value to a positive value or from a positive value to a negative value. In practice, this is accomplished by taking the difference between successive voltage readings and by determining when the difference reaches a minimum or a maximum value.

With reference to FIG. 1, it is seen that the voltage derivative curve dV/dt changes from increasing to decreasing at second inflection point B. Therefore, if the battery charging operation commences when the battery voltage is in Region I, the battery voltage will pass through both inflection points A and B. On the other hand, if the battery is already partially charged such that the battery charging operation commences in Region III, the A inflection point is never reached. In either case, however, the battery charging operation should be caused to terminate after the B inflection point is detected, as this represents the fully charged condition. Note that the battery voltage actually begins to fall off or drop shortly after the actual charge termination point C is reached. This region should therefore be avoided as this is the region in which overtemperature and high pressure conditions begin to manifest themselves.

The present invention allows a flat slope or negative slope charge termination system to be reliably implemented. The flat slope or minus slope system, referred to as "slope detection", can be used in conjunction with the Saar double inflection point analysis or as an alternative to it. The slope detection technique has been found to work particularly well with metal nickel hydride batteries.

Essentially, the slope detection technique looks for the point on the voltage-time curve at which the slope goes to zero (flat slope) or goes negative. Referring to FIG. 1, it is seen that the slope dV/dt goes to zero at the peak voltage designated generally by reference letter P. Note that the point P is near, but not necessarily coincident with, point C. Recall that point C is the point at which the Saar double inflection point analysis actually terminates charging current. In practice, the precise Saar termination point C depends on the response time of the system and on the degree of digital filtering employed. In other words, point C occurs sometime after inflection point B has occurred and the system has had time to respond to its occurrence. Therefore, in actual practice, point P detected by the flat slope or zero slope technique and point C used in the Saar technique may be in fact coincident, or either point may occur slightly before the other. Thus the flat slope or minus slope detection mechanism can serve as a good backup system in the event the Saar system does not respond quickly enough for a given battery.

One difficulty with the flat slope or falling slope technique is encountered in the flat region of the curve designated generally by II in FIG. 1. Metal nickel hydride batteries are less prone to difficulty in this region because the voltage-time curve of such batteries rises more steeply than the curve of the illustrated nickel cadmium battery. While, in fact, the slope of the voltage-time curve is rising in region II, as evidenced by the positive first derivative dV/dt, the voltage is not rising very rapidly. Thus, it is possible for spurious noise fluctuations to produce a false trigger in this region. Note in FIG. 1 there is a slight perturbation designated generally at X which is indicative of the type of noise fluctuations which can occur. If one of these perturbations were to appear as a zero slope or falling slope (dV/dt$\leq$0), the flat slope or falling slope termination technique would cause premature termination of the battery charging current.

To combat this problem, the present invention employs a sampling rate modulation technique or a slope detection disabling technique which both ensure that the readings taken during the flat portion of the curve do not produce false triggering. These techniques can be implemented in different ways. Several will be illustrated here.

Figure 3A:
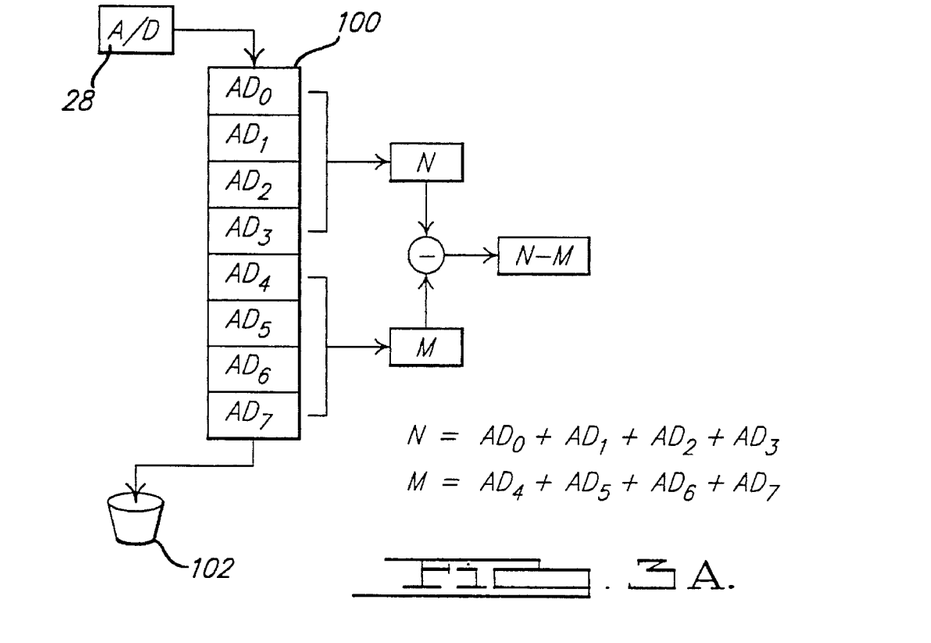
FIGS. 3A–3C (collectively referred to as FIG. 3) illustrate the stack data structure of one embodiment of the invention.
Figure 3B:
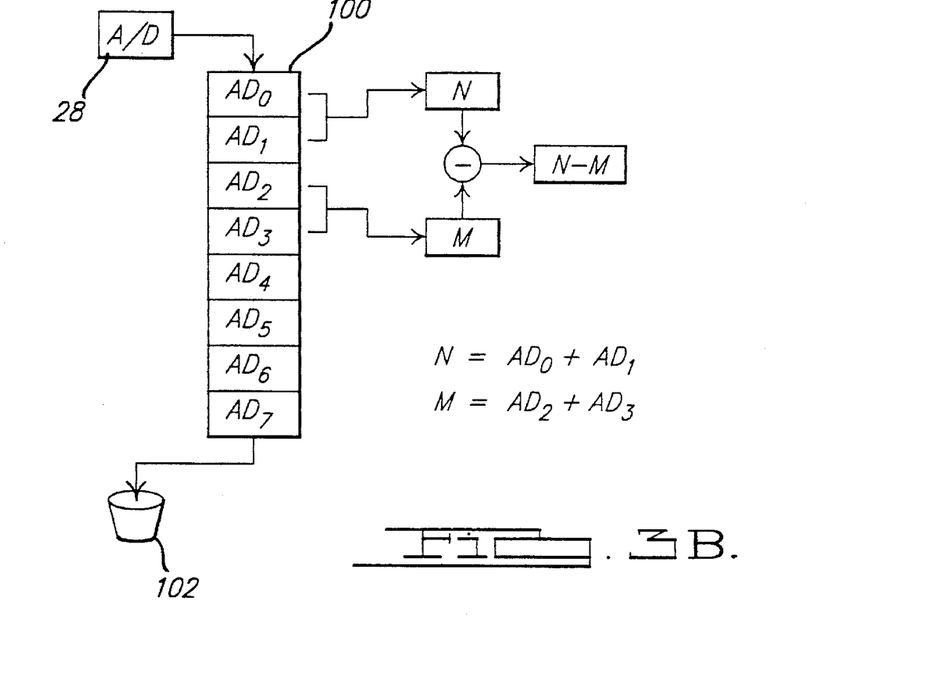
Figure 3C:
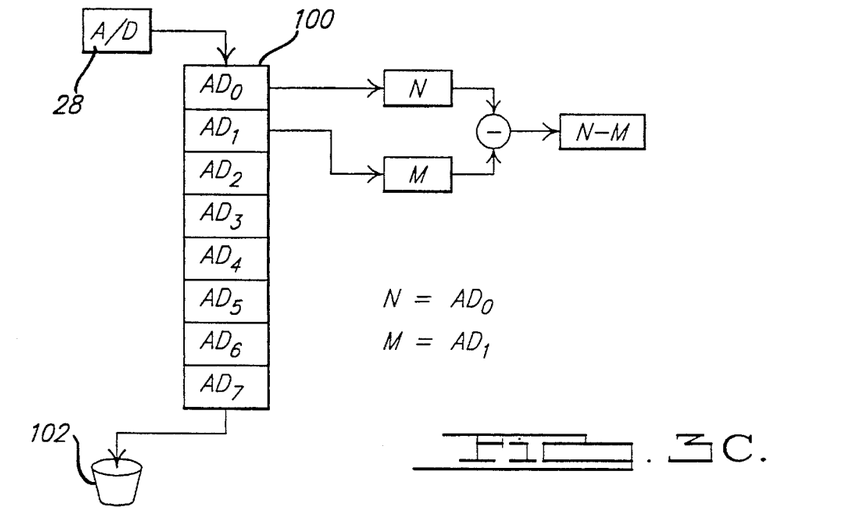

One technique for producing sampling rate modulation is to perform the modulation digitally by stack manipulation. The stack manipulation technique takes advantage of the fact that current-day charge termination routines for implementing the Saar technique use a stack-like data structure for storing, averaging and processing the digitally sampled voltage readings. Referring to FIGS. 3A–3C (collectively referred to as FIG. 3), the stack-like data structure is illustrated at 100. The presently preferred embodiment employs a data structure capable of storing eight digital values supplied by analog-to-digital converter 28. As each sample is taken by the analog-to-digital converter, the corresponding digital value is pushed onto stack 100 so that it occupies location $AD_0$. By this action, the previously existing $AD_0$ is pushed down to location $AD_1$; $AD_1$ is pushed down to $AD_2$; and so forth. At the opposite end of the data structure the terminal value $AD_7$ is simply discarded as diagrammatically illustrated by bit bucket 102. This data structure is used in implementing the Saar technique. This same data structure may also be used to implement the flat slope or negative slope detection technique. In this regard, both the Saar technique and the slope detection technique derive values which reflect the slope of the voltage-time curve.

By way of illustration, refer to FIG. 3A which illustrates how all eight values stored on stack 100 may be processed and used to produce a slope reading. As diagrammatically illustrated, the newest four values on the stack are added together; similarly the oldest four values are added together. The resulting sums M and N, respectively, are subtracted to yield a value N–M indicative of slope. In this regard, slope will be understood as the time rate of change in the voltage (dV/dt). Since the sampling rate is known, and in this case constant, the resulting N–M difference is indicative of slope.

The slope detection termination technique monitors the slope value N–M. When that value becomes zero or goes negative, termination of the charging current is triggered.

Basing the slope detection technique on the cumulative effect of eight samples may not be fast enough in practice to prevent overcharging. The presently preferred embodiment takes voltage samples every 16 seconds. Thus by subtracting groups of four numbers, the detection scheme lags by 4×16, or 64 seconds. This time lag may be too long to avoid overcharging.

FIG. 3B illustrates a stack manipulation technique whereby this 64-second time lag can be cut in half. In FIG. 3B pairs of digital values are added together and then subtracted, as illustrated. In FIG. 3B values $AD_0$ and $AD_1$ are added together as intermediate value M and values $AD_2$ and $AD_3$ are added together as intermediate value N. The intermediate values are subtracted, as before, to arrive at a slope reading. Since groups of two readings are used instead of groups of four, the time lag is reduced to 2×16, or 32 seconds.

For even quicker response time, FIG. 3 illustrates two individual readings $AD_0$ and $AD_1$ used directly to produce the slope reading. In this case, since individual readings are used directly, the slope value lags only 16 seconds.

With the foregoing in mind, it will now be better appreciated how a spurious voltage reading can produce a false termination. When the signal processing illustrated in FIG. 3A is used, a single erroneously low reading will not affect the outcome. This is because the single reading is, in effect, averaged with three other readings which were all taken at different times. Thus the averaging effect of the processing illustrated in FIG. 3A renders it unlikely that a false termination will occur.

Contrast this with the processing illustrated in FIG. 3C. Here, two individual readings are used to produce the slope value. An erroneous reading can, therefore, produce a false indication that the slope has gone zero or negative.

Figure 4:
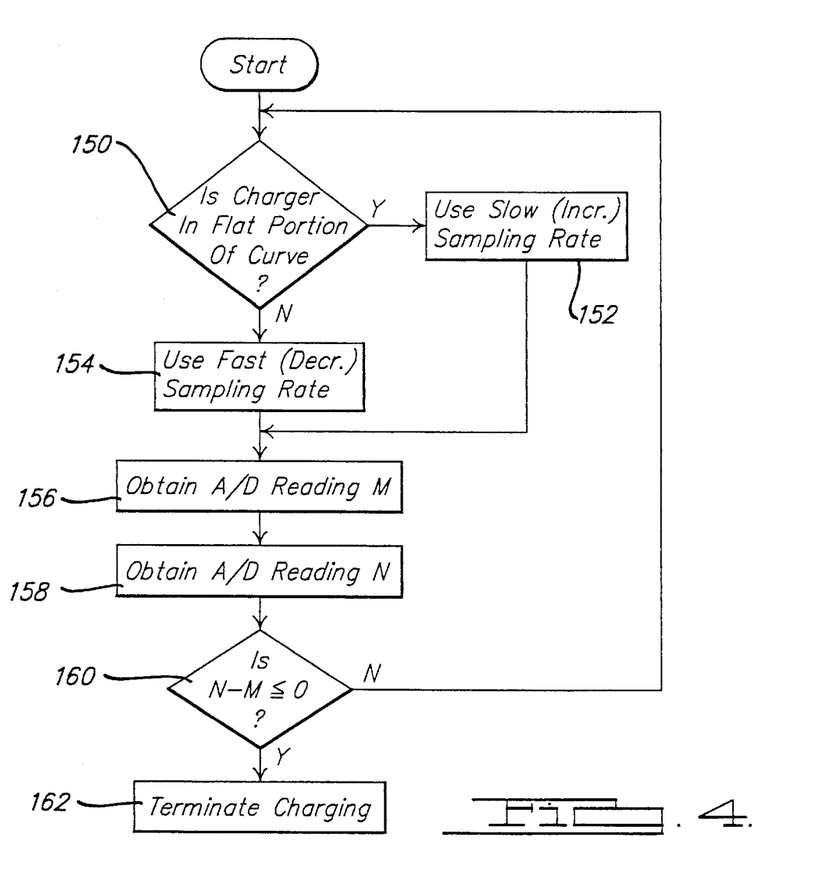
FIG. 4 is a flowchart illustrating a presently preferred charge termination procedure in accordance with the present invention.

The present invention automatically modulates the effective sampling rate to produce fast response time when the signal-to-noise ratio is high and to average out or ignore local voltage perturbations when the signal-to-noise ratio is low. One embodiment for accomplishing this is illustrated in FIG. 4. In FIG. 4 a test is performed at step 150 to determine whether the charger is operating in the flat portion of the voltage-time curve represented by the region II in FIG. 1. If so, at step 152, the effective sampling rate is modulated to employ the highly averaged, comparatively slow responding sampling technique of FIG. 3A. On the other hand, if the charger is not operating in the flat region of the curve, control proceeds to step 154 where a faster acting, less averaged sampling technique is used, such as the technique of FIG. 3C (or optionally the technique of FIG. 3B).

Next, in steps 156 and 158 two consecutive readings M and N are taken. Then, in step 160, if N–M is less than or equal to zero, charging is terminated at step 162. Otherwise, control branches back to step 150, as illustrated.

There are several ways to determine if the battery charger is operating in the flat portion of the curve. One way is to monitor the individual voltage readings. If the individual readings are below a threshold value, then it can be assumed that the charger is operating in the flat portion of the curve. Another technique is simply measuring the elapsed time that the battery charger has been operating. In most cases, the battery charging curve is sufficiently stable such that it can be assumed the charger is in the flat portion of the curve after an elapsed of about 15% of the full charging cycle.

Figure 5:
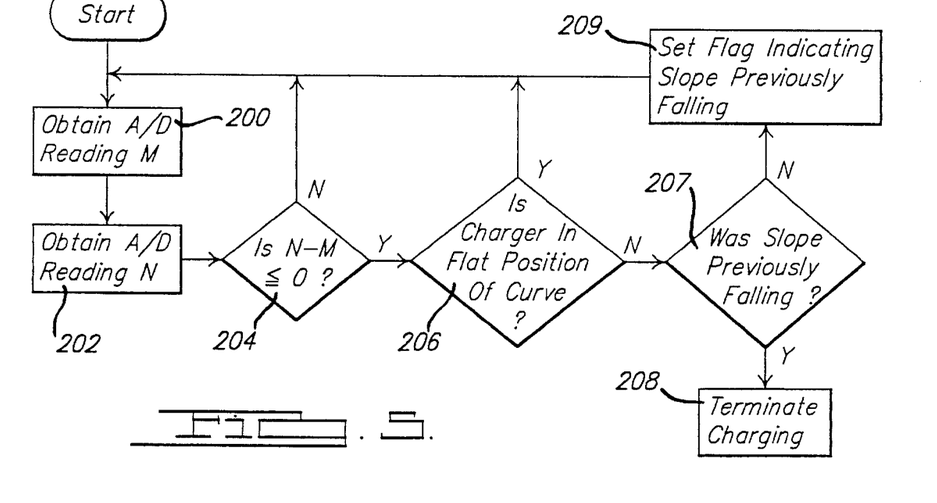
FIG. 5 is a flowchart illustrating an alternate charge termination procedure in accordance with the present invention.

An alternative embodiment of the invention is illustrated in FIG. 5. As will be seen, in this embodiment the slope detection technique is disabled when the charger is operating in the flat portion of the curve. Referring to FIG. 5, analog to digital readings are employed at steps 200 and 202 to obtain successive readings N and M, each indicative of battery voltage at different points along the voltage-time curve. Next, in step 204, these values are compared, such as by subtracting N–M to determine if the slope of the curve has gone to zero (flat) or gone negative. If not, then the routine simply branches back to step 200 where the above process is repeated. On the other hand, if the slope has gone to zero or gone negative control proceeds to step 206 where a determination is made whether the charger is currently in the flat portion of the curve. This can be done using any of the techniques described above in connection with FIG. 4. If the charger is in the flat portion of the curve, control simply branches back to step 200 where the above steps are again repeated. In other words, in the flat portion of the curve a negative slope or zero slope is simply ignored. On the other hand, if at step 206 the charger is not in the flat portion of the curve, then control proceeds to step 207 where a flag is tested to determine whether the slope was previously falling. If so, then charging is terminated at step 208. If not, step 209 is performed to set the flag, so that the next flat slope or falling slope condition will cause charge termination. Thus the routine of FIG. 4 provides additional filtering by requiring two detections of a flat slope or falling slope before charge termination is triggered. Naturally, this filtering technique can be expanded to require more than two slope detections, if desired. This filtering technique can also be used in the other embodiments described above.

Upon reflection it will be seen that causing the result of step 204 to be ignored at step 206 has the effect of decreasing the sample rate to a period longer than the period of region II (FIG. 1) of the curve. Stated differently, the results of data obtained during region II of the curve may be effectively ignored by extending the sampling rate so that no samples are produced during the region II period.

Figure 6:
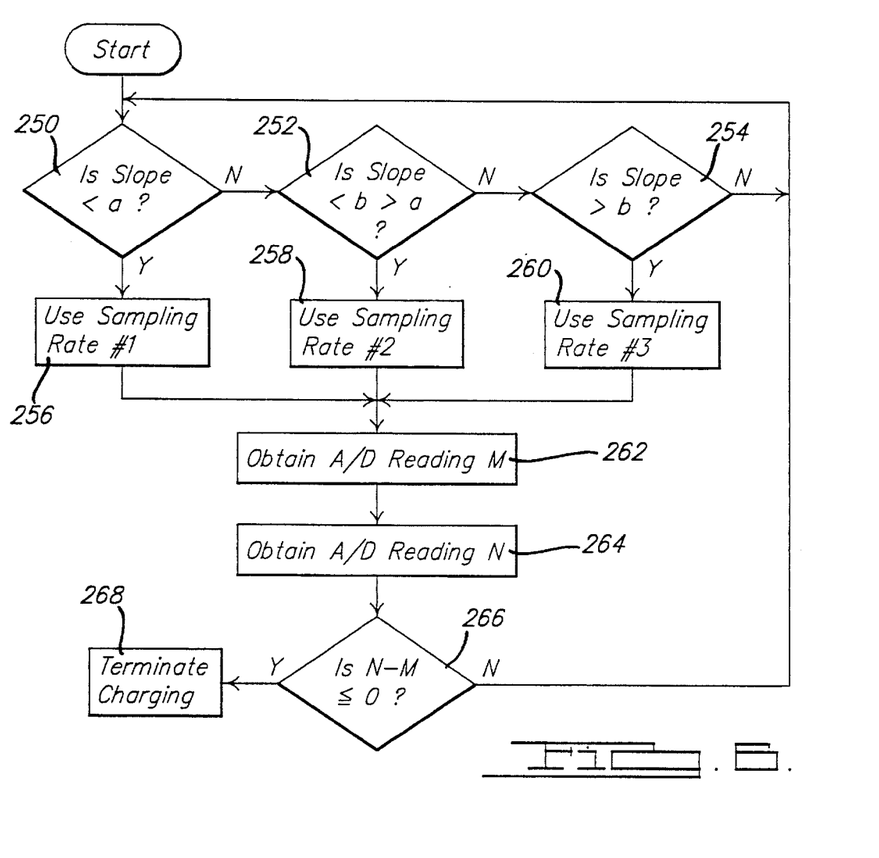
FIG. 6 is an adaptive embodiment of the invention.

The above-described techniques for modulating the sampling rate to block the effects of noise in the flat portion of the curve are static techniques, in that a predetermined sampling rate modulation technique is employed automatically when the flat region of the curve is reached. If desired, the modulation technique can also be employed dynamically, where the degree of sampling rate modulation is actively selected based on the sensed signal-to-noise ratio. One embodiment of such a dynamic technique has been illustrated in FIG. 6. In FIG. 6, the slope of the battery voltage is compared to several predetermined levels at steps 250, 252, and 254. Based on this comparison, the appropriate sampling rate is selected in steps 256, 258, and 260, respectively. These different sampling rates could be effected using the stack manipulation techniques illustrated in FIGS. 3A–3C. For example, for low slopes the technique of FIG. 3A could be used for sampling rate #1. For intermediate slopes the sampling rate technique of FIG. 8B could be used for sampling rate #2. For higher slopes the sampling technique of FIG. 3C could be used for sampling rate #3.

After the appropriate sampling rate has been selected, the appropriate readings are taken at steps 262 and 264 to obtain the values M and N. Using the stack-like data structure illustrated in FIGS. 3A–3C, these M and N values can simply be obtained by selecting the appropriate numbers from the stack. Once obtained, the M and N values are compared at step 266, whereupon charge termination is triggered at step 268 if the slope (N–M) is zero or negative. Otherwise, control branches back to the starting point where the above procedure is repeated.

The embodiment of FIG. 6 thus dynamically selects the appropriate sampling rate based on actual measured conditions. While a simple slope measurement has been used in steps 250, 252, and 254, other suitable techniques can also be used.

From the foregoing it will be understood that the present invention provides a mechanism to allow slope detection techniques to be employed, either individually, or in conjunction with other techniques, such as the Saar technique. The invention solves the problem of false triggering due to noise in the flat regions of the voltage-time curve. Therefore, the invention is most advantageous when used with batteries such as nickel cadmium batteries, which exhibit portions of relatively flat slope.

While the invention has been described in connection with the presently preferred embodiment, it will be understood that certain modifications can be made to the illustrated embodiment without departing from the spirit of the invention as set forth in the appended claims.

What is claimed is:

1. A method of charging a battery comprising the steps of:

applying a charging current to the battery;

for a first time interval, testing the battery to obtain data of battery voltage as a function of time and evaluating said data to determine if the time rate of change of said voltage is not positive during said first time interval;

terminating the application of charging current to the battery if said time rate of change is not positive during said first time interval;

after the completion of said first time interval, waiting for a second time interval;

after the completion of said second time interval, testing the battery to obtain data of battery voltage as a function of time and evaluating said data to determine if the time rate of change of said voltage is not positive at any time after said second time interval;

terminating the application of charging current to the battery if said time rate of change is not positive at any time after said second time interval.

2. The method of claim 1 further comprising establishing a predetermined charging time indicative of the approximate time required to fully charge a fully discharged battery and wherein said first time interval is a predetermined percentage of said charging time.

3. The method of claim 2 wherein said predetermined percentage is on the order of about 15 percent (15%).

4. The method of claim 1 wherein said first predetermined time is established adaptively, based on said data of battery voltage.

5. The method of claim 1 wherein said second predetermined time is established adaptively, based on said data of battery voltage.

6. The method of claim 1 further comprising terminating said second time interval when said battery voltage is above a predetermined voltage.

7. A method of charging a battery comprising the steps of:

applying a charging current to the battery;

for a first time interval, obtaining samples of battery voltage at a first predetermined sampling rate to obtain data of battery voltage as a function of time;

after completion of said first time interval, for a second time interval, obtaining samples of battery voltage at a second predetermined sampling rate longer than said first rate to obtain data of battery voltage as a function of time;

after completion of said second time interval, obtaining samples of battery voltage at a third predetermined sampling rate shorter than said second sampling rate;

evaluating said data to determine if the time rate of change of said voltage is not positive during said first time interval; and terminating the application of charging current to the battery if said time rate of change is not positive during said first time interval.

8. The method of claim 7 wherein said first and third predetermined sampling rates are substantially equal.

9. The method of claim 7 further comprising establishing a predetermined charging time indicative of the approximate time required to fully charge a fully discharged battery and wherein said first time interval is a predetermined percentage of said charging time.

10. The method of claim 7 wherein said predetermined percentage is on the order of about 15 percent (15%).

11. The method of claim 7 further comprising storing said data of battery voltage in a data structure and wherein said second predetermined sampling rate is made longer than said first predetermined sampling rate by selective manipulation of the data stored in said data structure.

12. The method of claim 7 wherein said first predetermined time is established adaptively based on said data of battery voltage.

13. The method of claim 7 wherein said second predetermined time is established adaptively based on said data of battery voltage.

14. A method for charging a battery comprising steps of:

supplying charge current to the battery;

measuring the slope of the battery voltage verses time curve to determine when the supplying of charge current to the battery should be terminated;

obtaining battery voltage data during the measuring step at a first sampling rate in a first time interval when the slope of the voltage curve exceeds a predetermined value;

obtaining battery voltage data during the measuring step at a second sampling rate less than the first sampling rate in a second time interval when the slope of the voltage curve is less than the predetermined value; and terminating the supplying of charge current when the slope of the battery voltage curve is not positive.

15. The method of claim 14 wherein the first sample rate is effectively decreased to the second sample rate by switching off the terminating step during the second time interval when the slope of the voltage curve is less than the predetermined value.

16. The method of claim 14 wherein the first sample rate is decreased to the second sample rate by storing the voltage data in a data structure and by selective manipulation of the data stored in the data structure.

17. The method of claim 14 wherein:

a predetermined charging time indicative of the approximate time required to fully charge a fully discharged battery is established and said first time interval is a predetermined percentage of said charging time.

18. The method of claim 17 wherein said predetermined percentage is on the order of about 15 percent (15%).

19. The method of claim 14 wherein said first time interval is established adaptively based on said data of battery voltage.

20. The method of claim 14 wherein said second time interval is established adaptively based on said data of battery voltage.

21. The method of claim 14 wherein the second time interval is terminated when said battery voltage is above a predetermined voltage.

22. The method of claim 14 wherein battery voltage is obtained during the measuring step at a third sampling rate faster than the second sampling rate in a third time interval when the slope of the voltage curve exceeds the predetermined value.

23. The method of claim 22 wherein the first and third sample rates are equal.

* * * * *